Patented Sept. 14, 1937

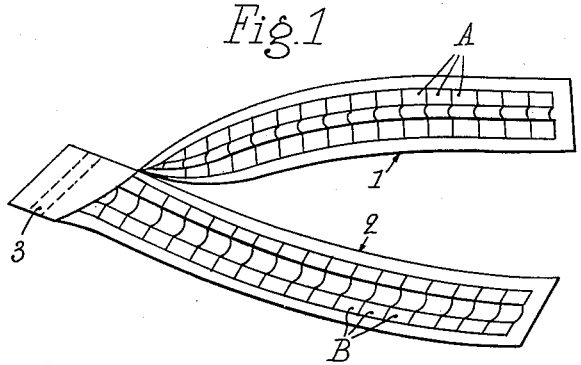
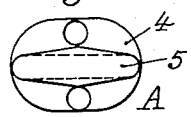
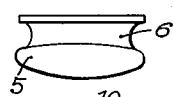
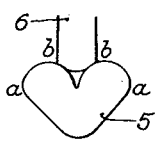
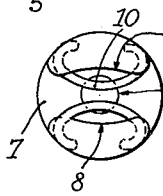
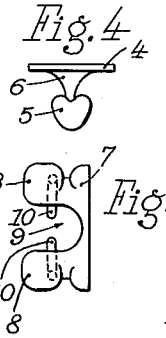
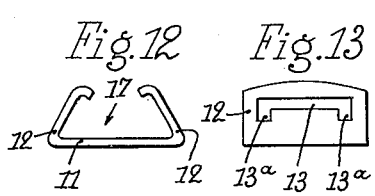
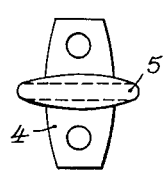
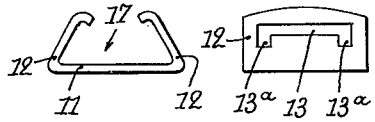
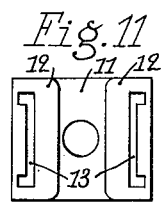
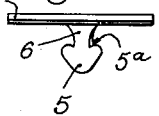
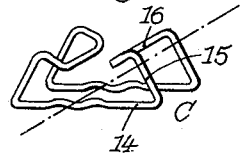

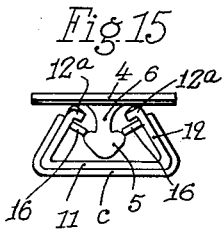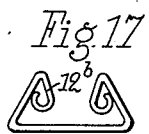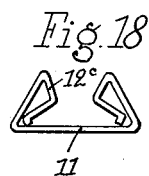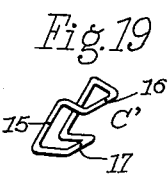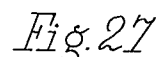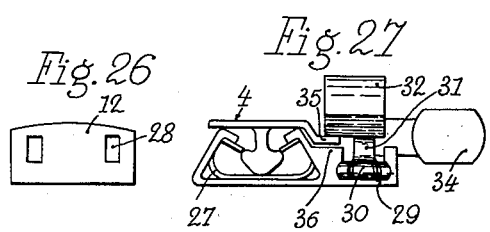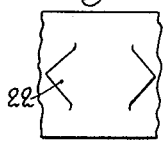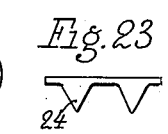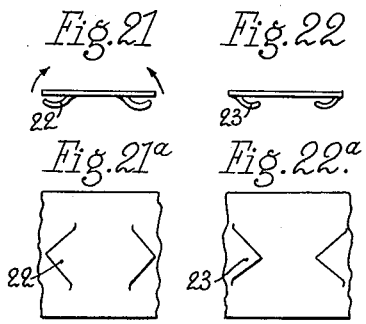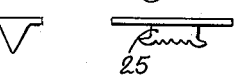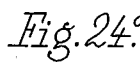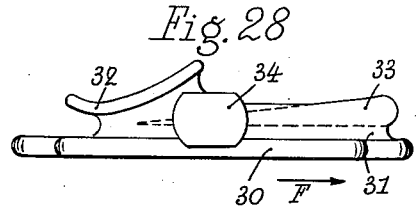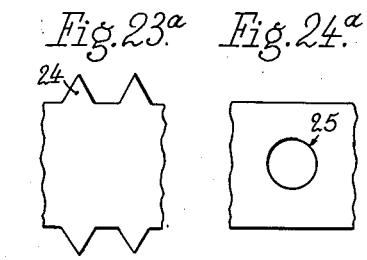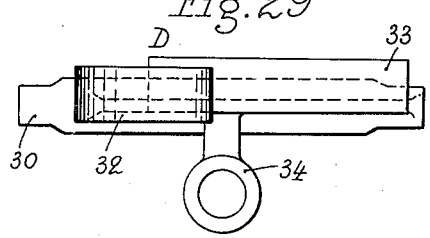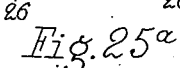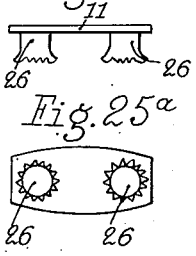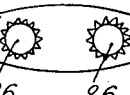

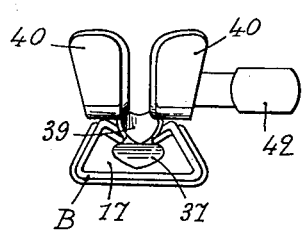
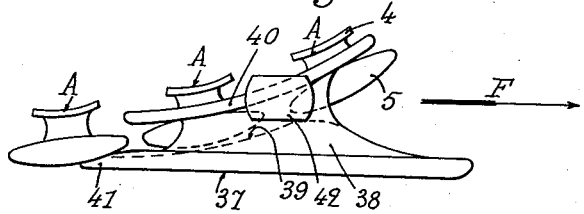
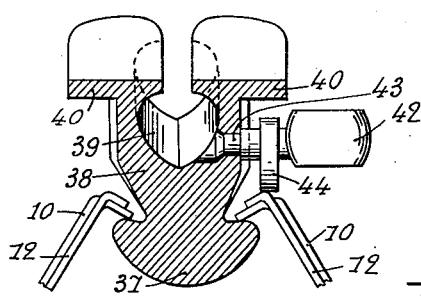
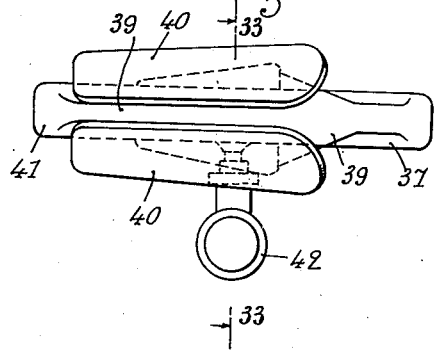
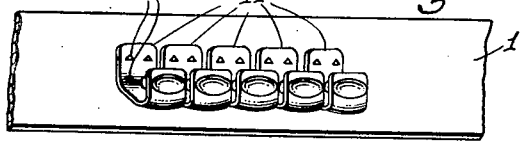
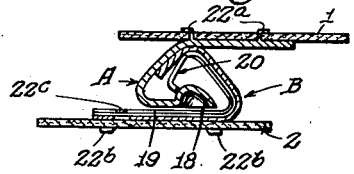
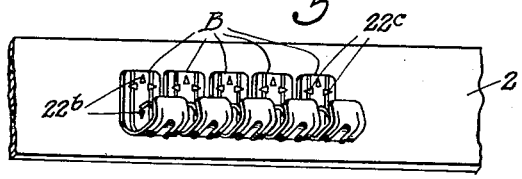

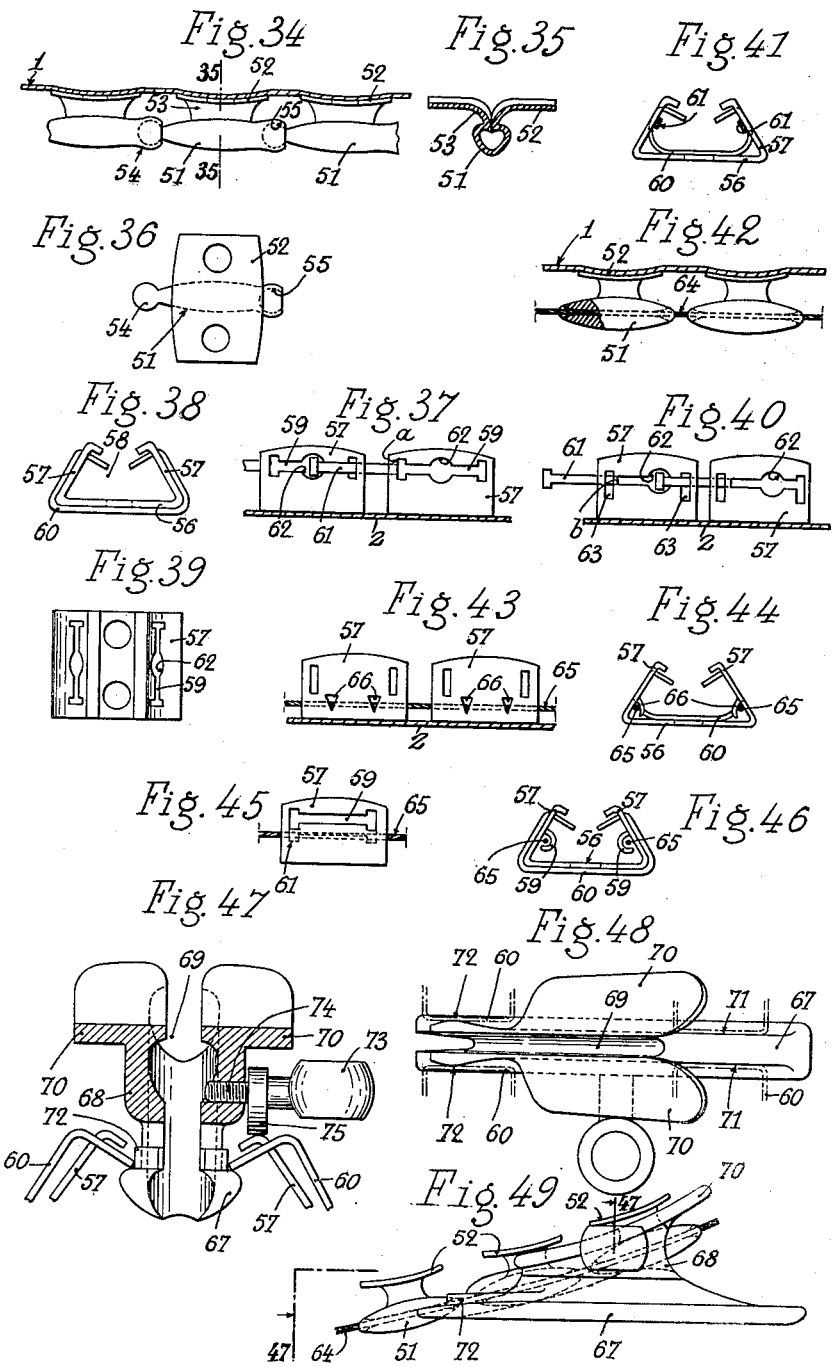

2,093,174

UNITED STATES PATENT OFFICE 2,093,174

PRESSURE FASTENING DEVICE OF THE CONTINUOUS TYPE

Rubin Podolsky, Asnieres, France

Application January 17, 1935, Serial No. 2,192
In France January 31, 1934

24 Claims. (Cl. 24—205)

The invention relates to a pressure fastening device of the type comprising a continuous row of male elements, adapted to be yieldingly pressed into a continuous row of female elements, these two rows of elements being secured respectively to the superposed edges of two bands of fabric, whalebones, tissues, etc., which are to be connected together in a detachable manner.

The invention relates to improvements in continuous pressure fastening devices of this type, and it has for its objects:

(a) To facilitate the engagement of the male and female elements owing to a suitable form of the head of the male elements;

(b) To prevent the male elements from getting out of the female elements under traction of the fabric or the like to which they are attached, although affording easy release when the male elements are pulled out in the proper direction;

(c) To provide for unobstructed lengthwise movement of the male elements along the row of female elements in order to impart improved flexibility or pliability to the fastening device;

(d) To assure the automatic closing and opening of the device by means of an improved slider;

(e) To improve the construction of the female elements in order to simplify their construction and to afford a more reliable connection between the male and the female elements.

Further features and advantages of the fastening device according to the invention will be set forth in the following description with reference to the accompanying drawings, in which:

Fig. 1 shows diagrammatically, in perspective, the assemblage of a continuous fastening device of the pressure type;

Figs. 2, 3 and 4 show in plan, in elevation, and in end view, a male element according to the invention;

Figs. 5 and 6 show in plan and in end view, a female element according to the invention;

Fig. 7 is a diagram showing the manner in which the spring co-operates with the head of the male element;

Figs. 8, 9 and 10 are views analogous to Figs. 2, 3 and 4, showing a modification of the male element;

Figs. 11 and 12 are views analogous to Figs. 5 and 6, showing a modification of the female element, the spring being removed;

Fig. 13 is a view in elevation, corresponding to Fig. 12;

Fig. 14 shows the spring of this female element;

Fig. 15 shows the assemblage of the male and female elements of Figs. 8 to 14;

Figs. 16 to 18 show modifications of the body of the female element;

Fig. 19 shows a modification of the spring;

Fig. 20 shows a row of male elements of a modified device for continuous fastening by pressure and clasping;

Fig. 20ª shows a row of female elements adapted to cooperate with the male elements shown in Fig. 20. Fig. 20ᵇ is a cross section through the fastening device shown in Figs. 20 and 20ª, in the closed position.

Figs. 21, 21ª, 22, 22ª, 23, 23ª, 24, 24ª and 25, 25ª, show in elevation and in plan various methods of securing the elements to bands of fabric or to other supports;

Fig. 26 shows another modification of the female element, in a fastening device with slider;

Figs. 27 to 29 show a lateral slider in end view, in elevation and in plan;

Figs. 30 to 32 are views of a central slider, analogous to Figs. 27 to 29;

Fig. 33 is a section on a larger scale, on the line 33—33 of Fig. 32;

Fig. 34 is a view in side elevation, of a portion of a chain consisting of male elements connected together;

Fig. 35 is a section of the same on the line 35—35 of Fig. 34;

Fig. 36 is a plan view of one of the male elements;

Fig. 37 is a side view of a portion of a chain consisting of female elements connected together;

Fig. 38 is an end view of one of the female elements of this chain;

Fig. 39 is a plan view of the same;

Figs. 40 and 41 are views of a modification, analogous to Figs. 37 and 38.

Fig. 42 is a view in side elevation, with a partial section of a portion of a chain consisting of male elements;

Fig. 43 is a view in side elevation, of a portion of a chain consisting of female elements;

Fig. 44 is an end view of an element shown in Fig. 43;

Figs. 45 and 46 are views, analogous to Figs. 43 and 44, showing another method of securing each element of the chain;

Fig. 47 is an end view, with partial section on the line 47—47 of Fig. 49, of a modification of the central slider;

Fig. 48 is a plan view of the same slider;

Fig. 49 is an elevational view of the slider.

Referring to Fig. 1, I and 2 are two supports, one of which, at least, consists of a band of fabric or other supple or flexible material; A is a row of male elements mounted side by side upon the band 1, and B is a row of female elements mounted side by side upon the band 2. The two bands may be secured together at one end in any suitable manner, at 3 (by sewing, riveting, pressure button, or the like).

In the embodiment of Figs. 2 to 6, the male element A comprises a base portion 4 of any shape, a head 5 and a neck 6. The head 5 has a heart-shaped section (Fig. 4) and is tapered towards its ends, both in width (Fig. 2) and in height (Fig. 3); so as to have a practically ovoid form.

The female element comprises a base 7, two bosses 8 having between them a slot or channel 9, and two wire springs 10.

The channel 9 is narrowed at its ends (Fig. 5) so as to have, in plan view, a shape and size which are practically the same as those of the male element (Fig. 2). The springs 10 have a curved form; their free ends bear against the inner cylindrical wall of the bosses 8, and the middle part passes through the inner wall of each boss, and extends into the channel 9.

The elements A and B are mounted side by side upon the bands 1 and 2 by any suitable means, as shown diagrammatically in Fig. 1.

The form of the head 5 of elements A, which is tapered towards the ends, facilitates the insertion of these elements into the female elements B, inasmuch as each element A upon being engaged in a female element sets the next male element obliquely above the next female element, whereby said next male element is centered and guided by its thin portions, and enters like a wedge into the element B; as the springs of the latter snap past the head 5, the male element pivots about until it assumes its normal position within element B, and the male element A which has already been engaged in the row of elements B is not liable to be pulled off.

Closure of the fastening may thus be made simply by moving a finger with a slight pressure over one of the bands, even though the two bands may not be exactly aligned above each other.

Owing to the heart-shaped section of the head 5 (Fig. 7), the springs 10 will catch or hook upon the shoulders provided where the neck meets the head of the male element, thus holding same very securely in place.

This hooking or retaining action may be such as to prevent loosening of the fastening by exerting a pull in a plane at right angles to the row of elements. Opening can only take place, provided a pull is exerted at one end of one band, in order that the first element A should tilt longitudinally and its thin end should enter like a wedge between the springs of the female element to spread the same apart, whereupon the next following elements A will successively tilt longitudinally and get out of the female elements in the manner just described. This prevents undue loosening of the fastening at a point intermediate the ends thereof.

By varying the projection of the springs into the channel 9, they may be made to bear upon the head at any point between $a$ and $b$, which permits of varying, at will, the force required to separate the male elements from the female elements. The above device is satisfactory where a sliding movement of the rows of elements relatively to each other is not desired or to be obviated (fastening for gloves for example).

Figs. 8 to 14 show a slight modification of the shape of the male and female elements, which is chiefly designed in order to devise a fastening where the male elements may slide lengthwise along the row of the female elements. For this purpose the base 4 of the elements A is convex in a direction parallel to the longitudinal axis of the head (Fig. 9) and the grooves 5ᵃ in which the springs 16 are adapted to catch and to slide have a rectilinear or slightly convex outline.

The element B comprises a base 11, two side parts 12 having slots 13 which are widened at 13ᵃ, and a spring C (Fig. 14). The spring C has two horizontal parts 14 bearing against the base 11 and at each side, two inclined parts 15 which bear against the sides 12 and are connected with a horizontal branch 16 adapted to pass through the slot 13 and to extend into the channel 17, whose walls are rectilinear in this case.

The angles of the different elements are rounded, in order to prevent catching when the male elements are caused to slide lengthwise in the row of female elements.

Owing to the rectilinear form of the branches 16 of the springs and of the walls of the channel 17, and to the tapered form of the head 5 of the male element, this latter, when engaged in the female element (Fig. 15), may slide along the whole row of female elements.

With this device, the fastening operation is still easier. It may happen that, in closing the fastening device, some elements remain out of engagement with the female elements. With the device of Figs. 2 to 6, this would require opening of the fastening device and recommencing the operation. However, with the device of Figs. 8 to 15, any element which may have failed to properly engage the row of female elements may be brought to its proper place by giving a slight pressure with the finger, the adjacent elements situated at both sides of said non-engaged element sliding in the row of opposite elements, in one or both directions, to leave sufficient space for inserting the non-engaged element. In certain cases, it will be simply necessary to insert the first male element, and the closing operation will be made simply by sliding said first male element along the female row. Such a fastening device is thus automatic and continuous, and possesses a considerable flexibility or pliability since the sliding rows of elements will accommodate very small radii of curvature.

It will be seen in Figs. 12 and 15 that the sides 12 of the female element are formed with inturned flaps 12ᵃ, located above the projecting parts 16 of spring C. When an attempt is made to open the fastening device by pulling the male element A out of the female element B in the plane of Fig. 15 (at right angles to the longitudinal axis of head 5), parts 16 of spring C are jammed against flaps 12ᵃ, thus preventing said spring from yielding to the upward force exerted by head 5. However, opening is easily accomplished by tilting the male element in the plane of Fig. 9, one of the thin ends of head 5 entering like a wedge between the parts 16 of spring C which latter is free to yield to the lateral force exerted by the end of head 5.

Figs. 16 to 18 show that the sides 12 may be bent inwardly in order to form the bent parts 12ᵃ, 12ᵇ, 12ᶜ.

The bent portions 12ᶜ (Fig. 18) increase the rigidity of the element B by resisting a force which would tend to bend the sides 12 against the base 11. When the element is made of spring steel, the bent parts may serve to maintain the head of the male element, in which case a separate spring, such as is shown in Fig. 14, is not used.

The spring C, instead of being single (Fig. 14), may be divided into two parts C' (Fig. 19), each of which has a lower branch 17, bearing against the under side of the base 11. This arrangement is particularly useful when the element B is secured to the cloth band 1 by hooks (Figs. 21 and 22), which hooks serve at the same time to hold the half-springs and to secure the female elements to the band.

Figs. 20, 20ᵃ, 20ᵇ show a modification of a device for continuous fastening by pressure and clasping, in which the head 18 of the male element A, consists of a stamped boss whose section has the form of a half-heart and which is tapered at both ends; said head may be engaged laterally between the base 19 of the female element B and the spring 20 which extends towards the interior with reference to the single side 21 of the element B.

The mounting of the elements upon the bands 1 and 2 may be effected in various ways; their bases can be provided with cut out claws 22ᵃ, 22ᵇ or they can be pierced with holes for securing by sewing or by rivets or eyelets, for example. The springs 20 are secured to the base of the elements by means of cut out lugs 22ᶜ bent around the said springs.

In Figs. 21 to 23, the base is cut in order to form claws 22, 23 or 24. In Figs. 21 and 21ᵃ, the claws 22 have their points turned towards the exterior, this being preferable, as the band is held between the claws, whatever be the direction of the force, this being indicated by the arrows.

In Figs. 22 and 22ᵃ, the claws have their points turned towards the interior (a less favourable disposition), and in Figs. 23 and 23ᵃ, they are punched out at the edges of the base. In Figs. 24 and 24ᵃ, the mounting is effected by means of a central punched projection, and in Figs. 25 and 25ᵃ, by two lateral punched projections.

The fastening device above described may be provided with a slider, as in the fastening devices of the sliding catching type. The slider is particularly necessary in the case in which the projection of the springs of the female elements and the form of the head of the male elements are designed in such manner that it will be impossible to remove the male elements from the female elements by traction alone.

Figs. 26 to 29 show the disposition of a lateral slider D.

The elements B are herein provided with an inner spring 27 (Fig. 27), which is held in place by apertures, or stamped recesses 28 in the sides 12 (Fig. 26). They are extended laterally by a guide 29 in which is movable a sliding member 30, connected by a web 31 to a curved pressing piece 32 and to a sharp wedge 33.

The slider is provided laterally with a control knob 34.

The sliding member has a length which is practically equal to that of three female parts.

When the slider is displaced in the direction of the arrow F, the sliding member 30 will move in the guides 29 of the successive elements B, and the pressing piece 32 will engage upon the bent ends of the bases 4 of the male elements A, thus driving these latter into the elements B.

When the slider is moved in the contrary direction to the arrow F, the sharp end of the wedge will come between the ends 35 and the upper faces 36 of the guides 29, thus releasing the elements A from the elements B.

The knob 34 may be rotatably mounted, and may be provided with a cam or a locking bolt, which will permit to hold the slider in any given position, as will be further described with reference to Figs. 30 to 33. In these figures, the fastening device is provided with a central slider, comprising a sliding member 37, a web 38 in which is formed a longitudinal groove 39, and two lateral pressing pieces 40.

The sliding member 37, whose length is practically equal to that of three female elements, is engaged in said female elements, under the springs 10, in the manner of a male element A. Its width is such that, when it becomes engaged in the row of female elements, it is thus held fast.

The groove 39 has a cross-section which practically corresponds to that of a male element, and it is inclined from front to rear, as indicated in Fig. 31, and the pressing pieces 40 are substantially parallel with the bottom of the groove 39.

At the lower end of the slider, the sliding member 37 becomes sharp in order to form a wedge 41.

When the slider is moved in the direction of the arrow F by the knob 42, the sliding member will slide along the channel 17 in the elements B, and the pressing pieces 40 will be engaged, like the prongs of a fork, between the heads 5 and the bases 4 of the male elements A; the heads 5 will move along the groove 39 and will come near the elements B, in which they will finally engage.

When the slider is drawn in the other direction, the wedge 41 will be engaged between the bottom of the heads 5 and the bases of the elements B, and will thus raise the elements A, which are thus released from the elements B.

In the example herein represented, the knob 42 is rotatably mounted on the web 38 of the slider by means of a journal 43, and it carries a cam 44, which, in a certain angular position of the knob, presses against the upper end of the side 12 of the element B, thus holding the slider in position. In order to prevent the slider from being disengaged from the row of female elements, one of the female elements is flattened at each end of the row.

Figs. 34 to 46 relate more particularly to fastening devices operating by pressure, in which the elements in each row of male or female elements are connected together in such manner as to form a flexible chain which is continuous, but the bending of which is limited. The purpose of this restriction in the angular relative displacement between the adjacent elements is to prevent the slider from unduly getting out of one row of elements, which is liable to occur when the space between the successive elements in one row is relatively large, said space increasing as the radius of curvature of band 1 or 2 is shorter.

In the example of execution represented in Figs. 34 to 36, the head 51 of each male element has an elongated form, and is terminated at one end by a ball 54, whilst at the other end it has a socket 55 of corresponding form adapted to receive the ball of the head of the male element which is adjacent. Owing to this disposition, the heads of all the male elements of the fastening device are pivoted together in series, thus forming a flexible chain which is continuous, but whose bending is nevertheless limited.

In like manner, the female elements of the fastening device are joined together in such manner as to form a flexible chain which is continuous. In the example represented in Figs. 37 to 39, the material provided by the cutting of each slot 59 of the female element is turned down, in the interior of such element, by bending it around the edge a of the slot, and the end of the tongue 61 thus formed is bent over in order that it may be engaged in a rounded aperture 62 pertaining to the slot 59 of the element which is adjacent. In this manner, there is obtained a connection between two successive female elements, which connection is flexible by reason of the play of the end of the tongue 61 in the aperture 62. Each element is thus connected to both of the adjacent elements by two lateral connections which permit to constitute, with the whole assemblage of the female elements, a flexible chain which is continuous and whose bending is limited in order to prevent the release of the slider which will be further described.

Fig. 41 represents a modification of the female elements, in the case in which the spring 60, instead of being situated at the exterior of the element, is on the contrary situated in the interior of this element. In this example of execution, each side 57 of the female element has two slots 63 (Fig. 40), adapted to receive the branches of the spring 60. One of these slots 63 (the right-hand slot) is punched together with a slot 59 and a rounded aperture 62, in such way as to form a tongue 61 which is bent towards the other slot 63 of the same element, and on the inner side of this element, by bending it on the edge b of the slot 59. The tongue which is thus bent is applied against one branch of the spring 60, and its bent edge is inserted into the aperture 62 of the adjacent element, in which it is movable. Thus the flexible connection between the successive female elements is limited, whilst the springs 60 are well maintained by the tongues 61.

In Figs. 42 to 46, there is represented another method of connecting the elements of the fastening device by pressure, in order to form, by such elements, continuous flexible chains.

In the example of execution represented in Fig. 42, the head 51, of elongated form, of each male element is traversed lengthwise by a cord 64, which is secured to this element in any suitable manner. Preferably, the cord 64 is pinched at the middle of the head 51 of the male element; this latter has at each end a flaring recess for the free movement of the cord 64.

In Figs. 43 and 44, the female elements are shown as connected together by two cords 65. Each of these cords is secured, in the interior of the elements, to one of the sides 57. In the case in which the spring 60 is in the interior of the female element, the cord is held in place, preferably, by claws 66 which are cut in the side 57 and are bent down upon the cord 65.

In the case in which the spring 60 is at the exterior of the female element (Figs. 45 and 46), the cord 65 is held against the side 57 of the said element by the metal tongue 61 which is formed by the punching of the slot 59 and is bent down upon the said cord.

In Figs. 47 to 49 there is represented a modification of the central slider shown in Figs. 30 to 32, which is mounted in such manner as to facilitate the engagement and release of the male and the female elements. The said slider comprises a sliding member 67 which is engaged in the female elements under the outer ends of the springs 60, as well as a central longitudinal inclined groove 69, in which are slidable the heads 51 of the male members, and two lateral pressing pieces 70 which are practically parallel with the bottom of the groove 69.

The said sliding member is held in place in the female elements by means of two lateral grooves 71 in which the ends of the springs 60 are slidable. These grooves turn aside from each other, thus forming two bosses 72. Said bosses serve to separate the springs 60 during the movement of the sliding member in the female elements, and this permits the heads of the male elements to engage successively and without effort in the female elements, or to be released from these latter.

The slider is further provided with a device by which it can be held in any desired position with reference to the male and the female elements. This device consists of a knob 73 whose threaded end 74 is screwed into the web 68 and is partly engaged in the central groove 69, in which it makes contact with the male element located in this groove. The said knob is further provided with a cam 75, which, for a certain angular position of the said knob, presses upon the upper end of the side 57 of the female element. It will be noted that by a suitable operating of the knob 73, one may hold the slider to the male elements by means of the threaded end 74, and in the female elements by the cam 75.

Obviously, the invention is not limited to the details of construction which are above indicated solely by way of example. The elements may be mounted on bands of any kind (fabric, braid, leather, etc.), or on flexible bands (metal strips or whalebones). One of the rows may be mounted on a supple or flexible band, and the other on a rigid support (frame, structure, etc.).

The male elements consisting of galvanized brass or other suitable metal, may be made in a single piece by punching, stamping and bending, or by the riveting of a solid head to the base.

The female elements, which preferably consist of the same material as the male elements, will be made in a single piece by punching and bending.

The female elements shown in Figs. 16 to 18, should, however, be made of spring steel when a separate spring is not employed. This arrangement is less advantageous than the preceding, due to the difficulties in the manufacture of such elements when they are made of steel.

The slots 13 in the sides of the elements B (Fig. 13) may be replaced by two notches opening on the lateral edges of the sides 12.

By suitably reinforcing the springs represented in Fig. 14, it is possible to obtain a fastening device in which the female elements each consist of such a spring, secured to the band of fabric or the like, without any support.

The approximate dimensions of the parts are about 3 mm. in height, 3 to 5 mm. in width, and 5 to 7 mm. in length, the slider having about 15 mm. in length and 6 mm. in height.

The fastening devices above described have the advantage of being very flexible, the stress being distributed upon a great number of elements. Due to this feature, they will be adopted for the very light fabrics, such as China crape cloth, silk fabric, veiling, and the like. As the bands 1 and 2 are superposed, the fastening device will also be invisible, and thus the device is adapted for a great number of uses: for dressmaking, for making men's and women's clothing, for children's linen and clothing, sporting garments, hosiery, theatre costumes, changeable gowns; in the morocco leather trade, for travelling articles, for certain classes of shoes, gaiters, gloves, and and the like; in the automobile industry (for folding-top-cars), and the like.

Obviously, the invention is not limited to the combination of the different arrangements above described, such as the form of the male elements or of the female elements, of the head, the slider, and the like, but it further relates to continuous fastening devices operating by pressure, which may comprise any one of these arrangements, to the exclusion of the others.

Having now described my invention what I claim as new and desire to secure by Letters Patent is:

1. A fastening device comprising two bands of flexible material, a row of spaced male elements, each male element having a base portion attached to one of said bands, a neck projecting from said base portion, and an elongated head, whose longitudinal axis is parallel with said row and tapers towards both ends, both in height and width, and a row of spaced female elements attached to said other band, each having a longitudinal slot for yieldingly receiving the head of a male element.

2. A fastening device as claimed in claim 1, wherein each female element comprises a rigid support having an elongated slot extending throughout its whole length, an inturned flap extending along each side of said slot, and a separate lateral spring member extending along each of said flaps and projecting into said slot, each male element having shoulders where the neck meets the head, said spring members being adapted to yield apart and to snap past said shoulders for any movement of said head but for an outward movement in a plane at right angles to said longitudinal axis, when said springs hook upon said shoulders and are jammed against said flaps which prevent said springs from yielding apart.

3. A fastening device embodying a continuous row of male elements, each having a head of a substantially heart-shaped section, tapered at its ends, both in height and in length, and a continuous row of female elements, each being provided with an elongated slot for receiving, by pressure, the heads of said male elements, and with spring means for holding said heads in said slots.

4. A fastening device embodying a continuous row of female elements and a continuous row of male elements, each male element having a head of a substantially heart-shaped section, tapered at its ends, both in height and in length, thus facilitating the engagement by pressure of the male elements in the female elements.

5. A fastening device embodying a continuous row of male elements, each male element having a head of a substantially heart-shaped section, tapered at its ends, both in height and in length, and provided with two lateral shoulders, and a continuous row of female elements, each female element being provided with an elongated slot for receiving the heads of said male elements, and with spring means projecting laterally into said slot for engaging said shoulders.

6. A fastening device as claimed in claim 5 wherein each female element comprises a rigid base having lateral flanges determining between them said longitudinal slot, and a spring carried by said base and projecting between said flanges on either side of said slot, said flanges being provided with recesses for receiving said spring when the latter is spread by the head of said male element during its engagement in said female element and being ended by shoulders to be engaged by said spring during the disengagement of said male element from said female element.

7. A fastening device as claimed in claim 1 wherein said longitudinal slot tapers towards both ends in accordance with the shape of the head of said male element, to prevent lengthwise motion of the male elements along the row of female elements.

8. A fastening device as claimed in claim 1, wherein the contacting surfaces of said male and female elements are convexly rounded in a direction parallel with said axis to provide for unobstructed movement of the male elements along the row of female elements.

9. A fastening device as claimed in claim 5 wherein each female element comprises a rigid base having lateral flanges determining said longitudinal straight slot between them, the ends of said flanges being rounded and their opposite edges having a convex outline, whereby the row of male elements is slidable in the row of female elements.

10. A fastening device as claimed in claim 1 wherein each of said female elements comprises a base and a single flange curved towards said base and determining said slot between them and wherein the neck of each of said male elements is curved towards said base for insertion into said slot in the manner of a hook.

11. A fastening device as claimed in claim 5 wherein each female element comprises a rigid base having two lateral flanges which are bent inwardly in order to form a reinforcement which will prevent the crushing of said flanges against said base.

12. A fastening device as claimed in claim 3 wherein said spring means consists of a spring wire arranged in said female element and the ends of which project into the slot of said female element.

13. A fastening device as claimed in claim 3 wherein said spring means consists of a spring wire bearing against the outer part of said female element and extending through apertures in the sides of said female element for projecting into the slot of this latter.

14. A female element for fastening devices of the kind in which a row of male elements is adapted to yieldingly engage a row of female elements, said female element having a rigid body portion formed with a substantially rectangular elongated slot opening at both ends and two lateral wire spring members located adjacent the edges of said slot adapted to yieldingly retain a male element engaging said slot.

15. A female element as claimed in claim 14, wherein said lateral spring members are integrally connected by transverse legs, and wherein the sides of said rigid body are formed with transverse reinforcing stampings, forming inner recesses adapted to hold said legs against lengthwise displacement.

16. A female element for fastening devices of the kind in which a row of male elements is adapted to yieldingly engage a row of female elements, said female element having a rigid body portion consisting of a substantially rectangular metal foil bent laterally to form a central base portion, two upstanding sides and two inturned flaps, leaving between them a substantially rectangular elongated slot opening at both ends and two lateral wire spring members located adjacent the edges of said slot adapted to yieldingly retain a male element engaging said slot.

17. A female element as claimed in claim 16, wherein said flaps are extended by a reinforcing flange bent inwardly toward the base portion to prevent crushing of the sides against said base portion.

18. A fastening device as claimed in claim 1, wherein the cross section of said head forms an obtuse angle toward said neck and an acute angle in the opposite direction, said female elements having spring members substantially perpendicular to the respective sides of said obtuse angle when said head is in place in said female element, whereby said acute angle readily enters said female element, whereas said springs abutting against the sides of said obtuse angle, oppose loosening of said male element.

19. A fastening device comprising a continuous row of male elements, and a continuous row of female elements, each male element having a head and each female element having an elongated slot for yieldingly receiving the head of a male element and spring means for holding said head in said slot, and a slider slidably engaging within the elongated slots of said female elements and comprising a pressing member adapted to force the heads of the male elements into the slots of the female elements for one direction of movement of the slider and a wedge adapted to be forced between said heads and the bottom of said slots for disengaging said heads from said slots for the opposite direction of movement.

20. A slider for fastening device comprising a body portion ending in a wedge towards the front, a web having a longitudinal inclined groove and two lateral pressing members substantially parallel with the bottom of said groove, for the purpose set forth.

21. A slider as claimed in claim 20 wherein said body portion is provided with lateral grooves and with bosses arranged at one end of said grooves, for the purpose set forth.

22. A slider as claimed in claim 20 further comprising manually operated means for locking said slider at any desired point along the fastening device.

23. A slider as claimed in claim 20 further comprising a locking cam, and a knob operatively connected with said cam.

24. A slider as claimed in claim 20, further comprising a screw projecting into said groove and a knob operatively connected with said screw.

RUBIN PODOLSKY.